Jan. 5, 1932.  W. L. MORELAND  1,839,577
MOTOR VEHICLE
Filed June 15, 1927    2 Sheets-Sheet 1

INVENTOR.
Watt L. Moreland

Jan. 5, 1932. W. L. MORELAND 1,839,577
MOTOR VEHICLE
Filed June 15, 1927 2 Sheets-Sheet 2

INVENTOR.
Watt Moreland

Patented Jan. 5, 1932

1,839,577

UNITED STATES PATENT OFFICE

WATT L. MORELAND, OF LOS ANGELES, CALIFORNIA, ASSIGNOR TO MORELAND MOTOR TRUCK COMPANY, OF BURBANK, CALIFORNIA

MOTOR VEHICLE

Application filed June 15, 1927. Serial No. 198,993.

My invention relates to six-wheeled motor vehicles and more specifically relates to the suspension of the two rear axles and their interconnection.

The object of my invention is to interconnect the two rear axles by means of springs in such a manner that the axles maintain their vertical alignment irrespective of the road conditions or the upward or downward motion of said rear axles, allowing freedom to the axle housings and the wheels to accommodate themselves to the conditions of the road over which the motor vehicle travels.

Other objects will appear from the reading of the following details of the description in conjunction with the accompanying drawings.

Figure 1:
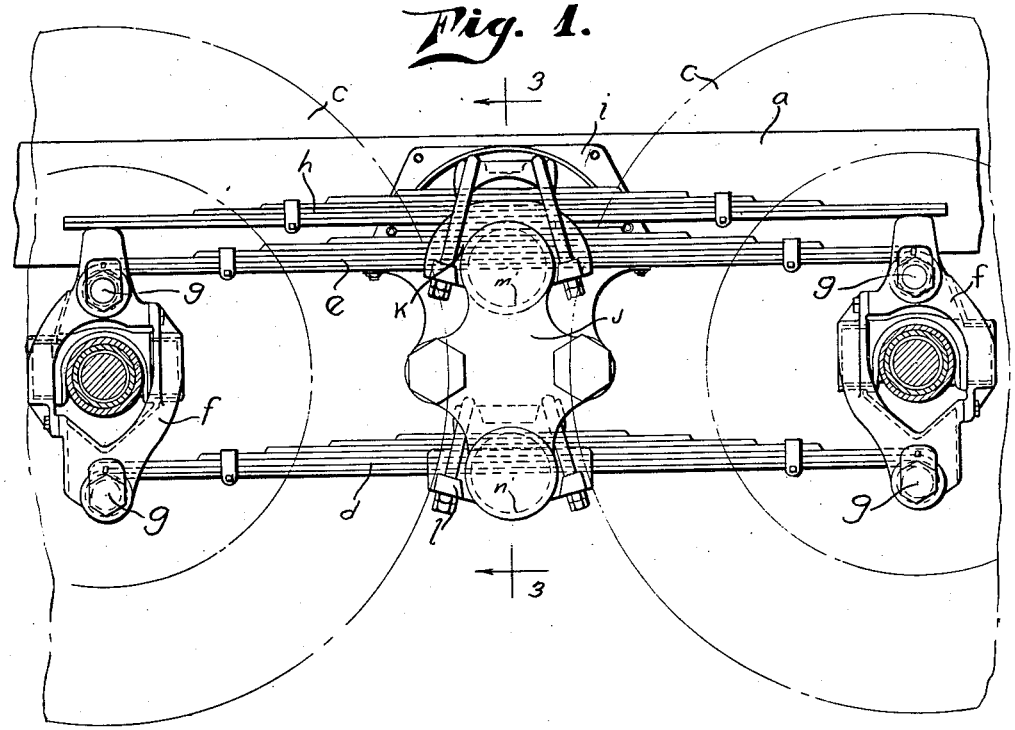
Figure 2:
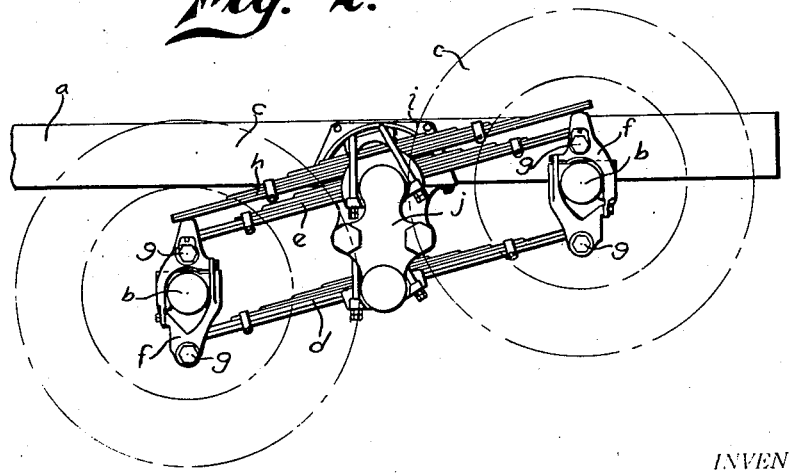
Figure 3:
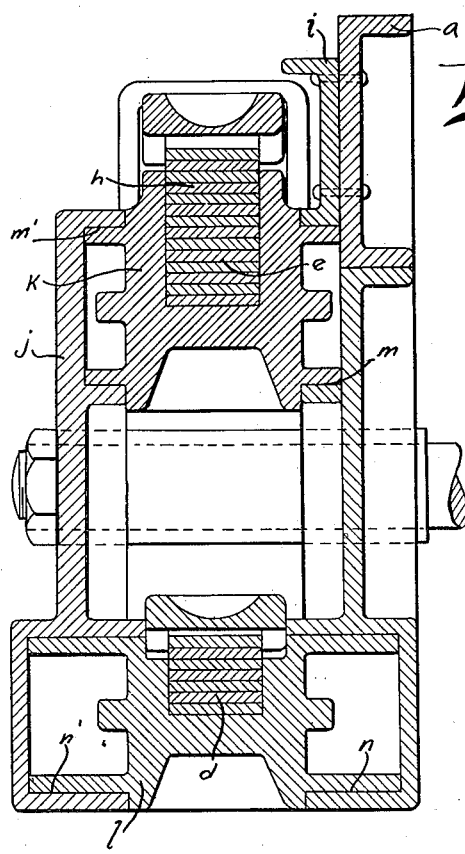
Figure 4:
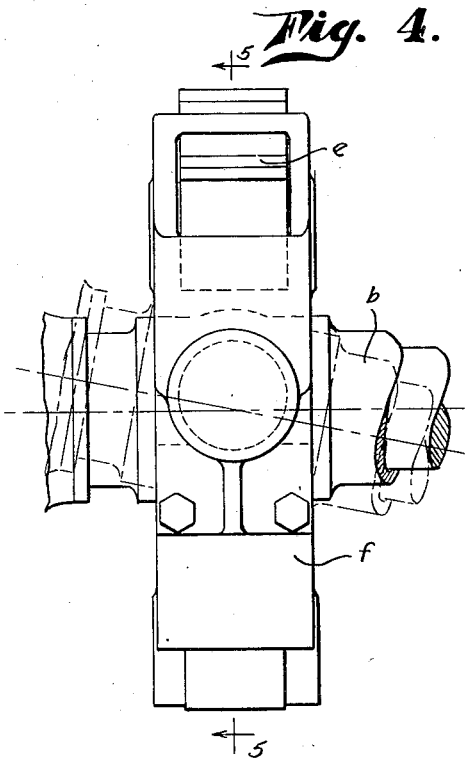
Figure 5:
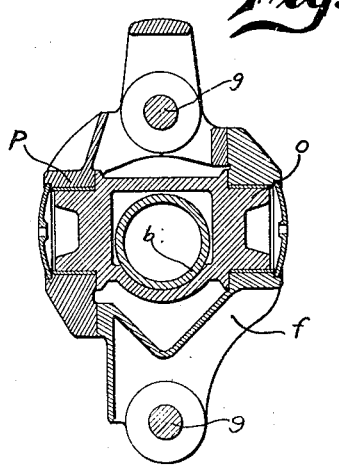
Figure 6:
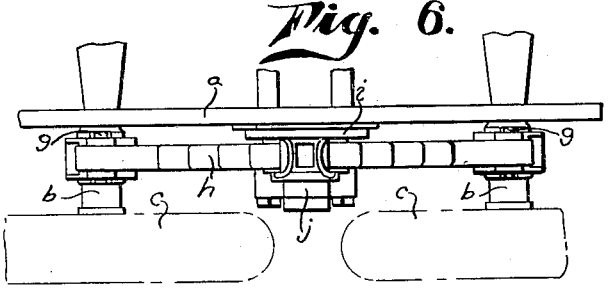

In the drawings, Fig. 1 is a side view of the spring suspension embodying my invention. Fig. 2 shows the position of the axles when the wheels do not remain in the same horizontal position; Fig. 3 shows a cross sectional view through the spring trunnion bracket taken through 3—3 of Fig. 1; Fig. 4 is a rear elevation of the axle yoke with a portion of the axle shown dotted in an oblique position; Fig. 5, a cross sectional view of the axle yoke; Fig. 6 a plan view of the spring suspension.

Like letters refer to like parts throughout the various views of the drawings, in which $a$ represents the well known frame of a motor vehicle, only a portion of the frame and the running gear being shown, the balance of the motor vehicle being of the conventional construction; $b$ is the rear axle as used in six-wheel constructions where said axles are comparatively close together, as shown in my pending application, Serial No. 75,408 filed December 14, 1925; $c$ represents the rear wheels, that is to say the middle and the rear wheels; $d$ and $e$ are the lower and upper springs which interconnect the two axle housings through axle yokes $f$ and spring bolts $g$; $h$ is an auxiliary spring, the ends of which rest on the top of the axle yokes $f$; $i$ is the spring trunnion bracket which is rigidly attached to the frame side member $a$, and which holds the springs $d$, $e$ and $h$ clamped to the lower spring trunnion $l$ and the upper spring trunnion $k$; $j$ is the outer cover for said trunnion bracket which assists in holding said trunnions $k$ and $l$ in position. Upper spring $e$ and auxiliary spring $h$ are clamped to the upper trunnion and pivot in bearings $m$ and $m'$, formed in the bracket $i$ and cover $j$ respectively, while lower spring $d$ clamped to lower trunnion $l$ pivots in bearings $n$ and $n'$ of the trunnion bracket and its cover.

As seen from Figures 1 and 3, the lowest leaves of springs $e$ and $d$, which are the main leaves, are resting substantially on a line passing through the axes of the trunnions $k$ and $l$, that is to say each trunnion is recessed as shown in Fig. 3, to permit the main leaves of the springs to be held close to the axes of the trunnions so that when the springs oscillate, transverse lines in the center, at the bottom of the main leaves of springs $e$ and $d$ will be practically stationary as they coincide with the axes of trunnions $k$ and $l$ respectively.

In operation, when the springs are flexed or when the axles should be raised or lowered while the wheels ride over obstructions on the road, or when one of the axles should be raised and the other lowered, as shown in Fig. 2, the axle housings will retain their vertical alignment, that is to say the said housings will not turn for the springs $d$ and $e$ form a parallelogram with the axle yokes $f$ attached to their outer ends. The springs, to which the trunnions are clamped, are capable of pivotal motion in bearings $m$, $m'$ and $n$, $n'$, while the ends of springs $e$ and $d$ can swivel around spring bolts $g$, of axle yokes $f$.

These axle yokes are provided with pivots $o$, which form part of the axle housings $d$, permitting said axle housings to oscillate in the axle yokes. In consequence, each axle housing may assume an oblique position with respect to a horizontal line without throwing any strain on the springs because of the free movement at such time between the axle housing $b$ and the axle yoke $f$.

Having now described my invention, what I claim as new and desire to protect by Letters Patent is:

1. In a vehicle chassis, a pair of axle housings provided with yokes, the housings kept in spaced relation with each other by a leaf spring, a bracket for connecting said spring to the frame, a trunnion mounted in the bracket, capable of oscillating therein, the main leaf of said spring resting on a line passing substantially through the axis of said trunnion, the spring ends in pivotal connection with the axle yokes of said housings.

2. In a vehicle chassis, a pair of axle housings provided with yokes, the housings kept in spaced relation with each other by two springs, a bracket for maintaining said springs in spaced relation with each other and for connecting them to the frame, trunnions mounted in the bracket capable of oscillating therein, the main leaf of each of said springs resting on a line substantially near the axis of one of said trunnions, the spring ends in pivotal connection with said axle yokes at separated points thereof.

3. In a vehicle chassis, a pair of axle housings provided with yokes, the housings kept in spaced relation with each other by two springs, a bracket for maintaining said springs in spaced relation with each other and for connecting them to the frame, trunnions mounted in the bracket capable of oscillating therein, the main leaf of each of said springs resting substantially near the axis of one of said trunnions, the spring ends in pivotal connection with said yokes at separated points thereof, an auxiliary spring mounted in the bracket and oscillating with one of said trunnions, the ends of the auxiliary spring extending to the axle yokes and exerting pressure on extensions of said yokes.

WATT L. MORELAND.